United States Patent
Sasadai

(10) Patent No.: US 9,189,054 B2
(45) Date of Patent: Nov. 17, 2015

(54) ELECTRONIC APPARATUS THAT CONTROLS SWITCHING TO ENERGY-SAVING MODE

(71) Applicant: Koji Sasadai, Osaka (JP)

(72) Inventor: Koji Sasadai, Osaka (JP)

(73) Assignee: KYOCERA Document Solutions Inc. (JP)

( * ) Notice: Subject to any disclaimer, the term of this patent is extended or adjusted under 35 U.S.C. 154(b) by 343 days.

(21) Appl. No.: 13/649,859

(22) Filed: Oct. 11, 2012

(65) Prior Publication Data

US 2013/0097439 A1    Apr. 18, 2013

(30) Foreign Application Priority Data

Oct. 14, 2011 (JP) ................................. 2011-227342
Aug. 2, 2012 (JP) ................................. 2012-171625

(51) Int. Cl.
| | | |
|---|---|---|
| H04L 12/10 | (2006.01) | |
| G06F 1/32 | (2006.01) | |
| G06F 3/12 | (2006.01) | |
| G06K 15/00 | (2006.01) | |

(52) U.S. Cl.
CPC ............ *G06F 1/3209* (2013.01); *G06F 1/3284* (2013.01); *G06F 3/1221* (2013.01); *G06F 3/1229* (2013.01); *G06F 3/1285* (2013.01); *G06K 15/4055* (2013.01); *H04L 12/10* (2013.01); *G06F 3/1236* (2013.01); *Y02B 60/1267* (2013.01); *Y02B 60/1271* (2013.01)

(58) Field of Classification Search
CPC ............... G06F 1/00; G06F 1/04; G06F 1/12; G06F 1/26; G06F 1/32; G06F 11/30; G06F 15/16
USPC ............................................................ 713/3
See application file for complete search history.

(56) References Cited

U.S. PATENT DOCUMENTS

| | | | | |
|---|---|---|---|---|
| 7,389,431 | B2 * | 6/2008 | Ohara | 713/310 |
| 2002/0172178 | A1 * | 11/2002 | Suzuki et al. | 370/338 |
| 2003/0235171 | A1 * | 12/2003 | Lundstrom et al. | 370/338 |
| 2006/0010331 | A1 | 1/2006 | Ohara | |
| 2006/0252441 | A1 * | 11/2006 | Harris et al. | 455/518 |
| 2007/0259673 | A1 * | 11/2007 | Willars et al. | 455/453 |

FOREIGN PATENT DOCUMENTS

| | | |
|---|---|---|
| JP | 2000-141820 A | 5/2000 |
| JP | 2000-343792 | 12/2000 |
| JP | 2001-301280 | 10/2001 |
| JP | 2005-066894 A | 3/2005 |
| JP | 2006-025212 | 1/2006 |
| JP | 2006-264057 A | 10/2006 |
| JP | 2008-271225 A | 11/2008 |

\* cited by examiner

*Primary Examiner* — Thomas Lee
*Assistant Examiner* — Mohammad A Rahman
(74) *Attorney, Agent, or Firm* — McDonnell Boehnen Hulbert & Berghoff LLP

(57) ABSTRACT

Provided is an electronic apparatus including: a network interface configured to receive data via a network; a communication processing unit configured to notify of a network communication type and a network communication amount of the received data; and an operation mode control unit configured to switch an operation mode from a normal mode to an energy-saving mode when a network communication does not occur in the network interface before a waiting time based on the network communication amount for each network communication type notified of from the communication processing unit has elapsed.

18 Claims, 3 Drawing Sheets

ELECTRONIC APPARATUS THAT CONTROLS SWITCHING TO ENERGY-SAVING MODE

REFERENCE TO RELATED APPLICATIONS

This application is based upon and claims the benefit of priority from the corresponding Japanese Patent Application Nos.: 2011-227342, filed in the Japan Patent Office on Oct. 14, 2011, which issued as Japanese Patent No. JP 5730247 on Apr. 17, 2015, and 2012-171625, filed in the Japan Patent Office on Aug. 2, 2012, the entire contents of which are incorporated herein by reference.

BACKGROUND

1. Technical Field

The present disclosure relates to an electronic apparatus that controls switching of an operation mode from a normal mode to an energy-saving mode.

2. Description of the Related Art

Electronic apparatus such as image forming apparatus include ones that have an energy-saving mode as an operation mode.

For example, a certain electronic apparatus sets a waiting time until shifting to the energy-saving mode based on a type of operation and an execution frequency. Further, another electronic apparatus sets the waiting time until shifting to the energy-saving mode based on a data type of received data.

In those electronic apparatus, a frequency with which data is received for each data type is not taken into consideration.

SUMMARY

An electronic apparatus according to an embodiment of the present disclosure includes a network interface, a communication processing unit, and an operation mode control unit. The network interface is configured to receive data via a network. The communication processing unit is configured to notify of a network communication type and a network communication amount of the received data. The operation mode control unit is configured to switch an operation mode from a normal mode to an energy-saving mode when a network communication does not occur in the network interface before a waiting time has elapsed. The waiting time is based on the network communication amount for each network communication type notified of from the communication processing unit.

A non-transitory computer-readable recording medium according to an embodiment of the present disclosure has stored thereon an operation mode control program executed by a computer of an electric apparatus. The operation mode control program includes first to third program codes. The first program code causes the computer to receive data via a network. The second program code causes the computer to notify of a network communication type and a network communication amount of the received data. The third program code causes the computer to switch an operation mode from a normal mode to an energy-saving mode when a network communication does not occur before awaiting time has elapsed. The waiting time is based on the network communication amount for each network communication type notified of by the second program code.

An operation mode control method according to an embodiment of the present disclosure includes: (i) receiving, by a network interface, data via a network; (ii) notifying, by a communication processing unit, of a network communication type and a network communication amount of the received data; and (iii) switching, by an operation mode control unit, an operation mode from a normal mode to an energy-saving mode when a network communication does not occur in the network interface before a waiting time has elapsed. The waiting time is based on the network communication amount for each network communication type notified of from the communication processing unit.

Additional features and advantages are described herein, and will be apparent from the following Detailed Description and the figures.

DETAILED DESCRIPTION

Next, a description is made of embodiments of the present disclosure with reference to the accompanying drawings.

1. First Embodiment

Figure 1:
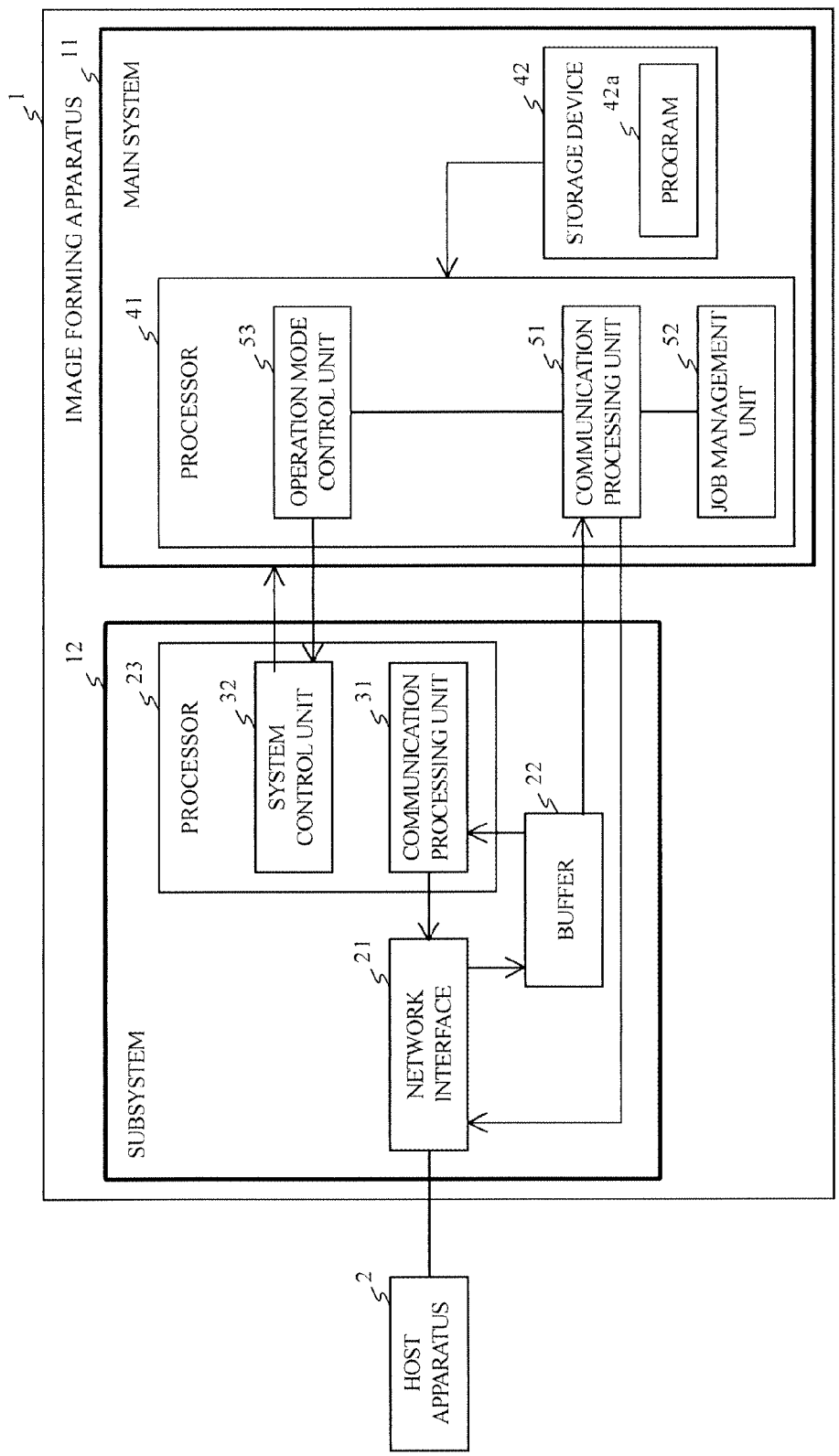
FIG. 1 illustrates a configuration of an image forming apparatus according to a first embodiment of the present disclosure.

FIG. 1 illustrates a configuration of an image forming apparatus according to a first embodiment of the present disclosure. Image forming apparatus 1 illustrated in FIG. 1 is a kind of electronic apparatus such as a printer or a multifunction peripheral.

In the first embodiment, image forming apparatus 1 is connected to host apparatus 2, such as a personal computer, via a network. Image forming apparatus 1 receives data from host apparatus 2 through network communications, and appropriately processes the data.

Image forming apparatus 1 includes main system 11 and subsystem 12. An operation mode of image forming apparatus 1 is any one of a normal mode and an energy-saving mode. In the normal mode, main system 11 and subsystem 12 operate by being supplied with power. In the energy-saving mode, the power supplied to main system 11 is stopped, and subsystem 12 operates by being supplied with power. For this reason, power consumption in the energy-saving mode is lower than power consumption in the normal mode.

Subsystem 12 includes network interface 21, buffer 22, and processor 23.

Network interface 21 is a communication circuit that receives data from host apparatus 2 via the network, and buffer 22 is a device such as a memory that temporarily stores the data received by network interface 21. The data received by network interface 21 is sequentially accumulated in buffer 22, and is erased from buffer 22 after being processed by main system 11 or subsystem 12.

In the normal mode, the data stored in buffer 22 is processed by main system 11, while in the energy-saving mode, the data stored in buffer 22 is processed by subsystem 12.

Processor 23 is a computer including a central processing unit (CPU), a read only memory (ROM), and a random access memory (RAM), and implements communication processing unit 31, system control unit 32, and the like by loading a program from a storage device (not shown), the ROM, or the like into the RAM and executing the program by the CPU.

In the energy-saving mode, the communication processing unit 31 reads received data that can be processed by communication processing unit 31 from buffer 22, and processes the received data. If the received data cannot be processed by communication processing unit 31, communication processing unit 31 causes system control unit 32 to switch the operation mode of image forming apparatus 1 from the energy-saving mode to the normal mode.

In other words, communication processing unit 31 performs network communications in the energy-saving mode, and if there is a request that can be responded to, sends a reply to the request.

System control unit 32 stops the power supply to main system 11 in accordance with an instruction from main system 11 in the normal mode, and restarts the power supply to main system 11 in accordance with an instruction or the like from communication processing unit 31 in the energy-saving mode.

On the other hand, main system 11 is an apparatus that controls an internal apparatus (printing apparatus, image reading apparatus, modem for facsimile communications, or the like) (not shown) to execute various jobs. Main system 11 includes processor 41 and storage device 42.

Processor 41 is computer including a CPU, a ROM, and a RAM, and implements communication processing unit 51, job management unit 52, operation mode control unit 53, and the like by loading a program from storage device 42, the ROM, or the like into the RAM and executing the program by the CPU.

Storage device 42 is a nonvolatile storage device such as a hard disk drive or a flash memory, and stores program 42*a* executed by processor 41. Note that, program 42*a* may be recorded in a recording medium having portability, and the recording medium and a driving device that reads program 42*a* from the recording medium may be used as storage device 42.

In the normal mode, the communication processing unit 51 reads and receives the received data from buffer 22 via a specific communication protocol. Communication processing unit 51 supplies the received data to job management unit 52 while notifying operation mode control unit 53 of a network communication type and a network communication amount of the received data. In the first embodiment, the network communication amount is the number of received packets such as IP packets. The network communication amount may be the number of sessions via a transmission control protocol (TCP), a user datagram protocol (UDP), or the like. Note that, with regard to the UDP, for example, if UDP data does not arrive in a specific time, it may be determined that the session has ended, and the number of sessions may be counted. Job management unit 52 executes a job (print job, facsimile transmission job, or the like) designated by the received data.

Operation mode control unit 53 sums up the network communication amount for each network communication type from a start time of image forming apparatus 1, and determines a waiting time corresponding to the network communication type from the network communication amount for each network communication type.

Then, when no network communications occur in network interface 21 before the waiting time corresponding to the network communication type has elapsed, operation mode control unit 53 switches the operation mode from the normal mode to the energy-saving mode.

In the first embodiment, when no network communications occur before the waiting time corresponding to the network communication type of the last network communication has elapsed, operation mode control unit 53 switches the operation mode from the normal mode to the energy-saving mode.

Further, in the first embodiment, based on the network communication amount for each network communication type and the network communication type, the waiting time until shifting to the energy-saving mode is determined.

Specifically, operation mode control unit 53 identifies the waiting time by adjusting a basic waiting time for each network communication type by using the network communication amount for each network communication type.

Further, in the first embodiment, the basic waiting time regarding the network communication type using the TCP is set shorter than the basic waiting time for the network communication type using the UDP.

Further, in the first embodiment, the network communication types are identified and classified by at least one of a protocol and a port number.

For example, data is received through the port number that differs for each type of job. Therefore the waiting time may be set for each type of job. For example, with regard to the network communication type of the port number assigned to the print job, when the operation mode returns to the normal mode, time is required for heating a fixing device before the print job is executed, and hence the waiting time until shifting to the energy-saving mode is set long. For example, the basic waiting time regarding the network communication type of the port number assigned to the print job is set longer than the basic waiting time for the network communication type of another port number.

Next, a description is made of an operation of image forming apparatus 1.

In the normal mode, communication processing unit 51 of main system 11 monitors buffer 22, reads the data received by network interface 21 from buffer 22, and performs reception processing via each protocol. Communication processing unit 51 supplies the received data to job management unit 52, and notifies operation mode control unit 53 of a session start, a session end, and the number of packets received in the session, for each network communication type designated in advance.

Based on a notification thereof, operation mode control unit 53 calculates a cumulative value of the network communication amount (here, number of received packets) regarding a network type of the session. In this case, the cumulative value of the network communication amount can be assumed as a cumulative value per specific period. The specific period can be set, for example, as follows:

Cumulative value in a session

Immediately preceding predetermined time period such as one hour, 24 hours, yesterday, last week Past time period corresponding to a current time period such as the same time of the day, the same day of the week, or the same month Further, operation mode control unit 53 starts timing at a time point at which sessions end for all the network communication types; in other words, an end time point of a last session (time point at which the network communications stop being performed by network interface 21). The operation mode control unit calculates an energy-saving mode shifting waiting time from the cumulative value of the network communication amount (here, number of received packets) regarding the network communication type of the last session. Specifically, the energy-saving mode shifting waiting time is calculated by adding a value obtained by multiplying the cumulative value of the number of received packets by a specific coefficient to the basic waiting time (fixed value) for the network communication type.

Then, if a notification of a new session start is not obtained from communication processing unit 51 after the timing starts before the energy-saving mode shifting waiting time has elapsed, operation mode control unit 53 outputs an instruction to shift to the energy-saving mode to system control unit 32 of subsystem 12. Upon receiving the instruction, system control unit 32 of subsystem 12 starts the operation of communication processing unit 31 and stops the power supply to main system 11 and the other internal apparatus. With this operation, the operation mode of image forming apparatus 1 shifts from the normal mode to the energy-saving mode.

On the other hand, if the notification of the new session start is obtained from communication processing unit 51 after the timing starts before the energy-saving mode shifting waiting time has elapsed, operation mode control unit 53 stops and resets the timing.

Figure 2:
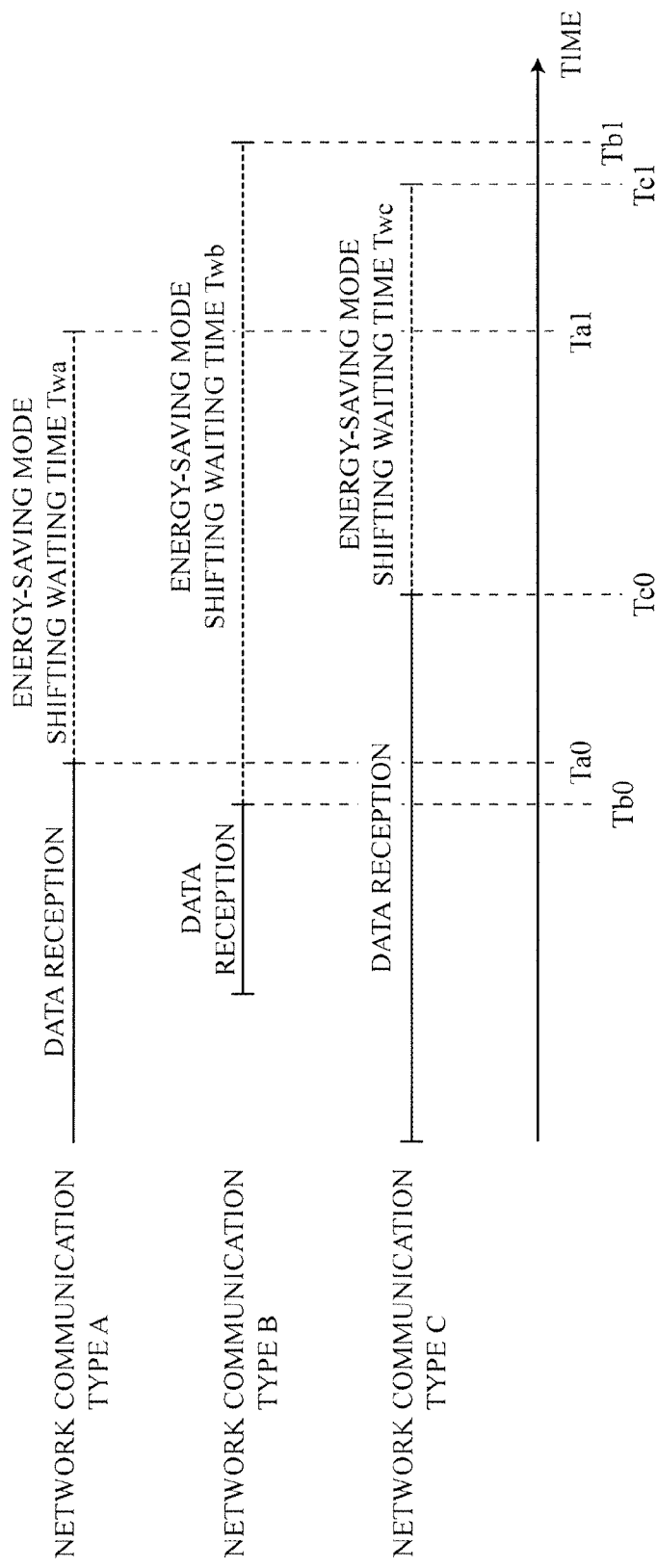
FIG. 2 illustrates an example of a communication period and an energy-saving mode shifting waiting time for each network communication type.

FIG. 2 illustrates an example of a communication period and the energy-saving mode shifting waiting time for each network communication type.

In a timing chart of FIG. 2, the data reception of the network communication type C ends last among end time points Ta0, Tb0, and Tc0 of data reception of network communication types A, B, and C, respectively. Hence, an operation mode control unit outputs the instruction to shift to the energy-saving mode at the time point Tc1 at which the energy-saving mode shifting waiting time Twc regarding the network communication type C elapses after the end time point Tc0 of the data reception of network communication type C.

As described above, according to the first embodiment, the operation mode control unit switches the operation mode from the normal mode to the energy-saving mode if no network communications occur before the waiting time based on the network communication amount for each network communication type has elapsed.

Accordingly, the network communication amount for each network communication type changes depending on a usage situation of the user, and hence the waiting time until shifting to the energy-saving mode is appropriately set based on the usage situation of the user.

2. Second Embodiment

In the first embodiment, if the notification of the new session start is obtained from a communication processing unit before the energy-saving mode shifting waiting time has elapsed, the operation mode control unit stops and resets the timing. In an image forming apparatus according to a second embodiment of the present disclosure, if the notification of the new session start is obtained from the communication processing unit before the energy-saving mode shifting waiting time has elapsed, the processing described below is executed. Note that, a basic configuration and other operations of the image forming apparatus according to the second embodiment are the same as those of the first embodiment.

Figure 3:
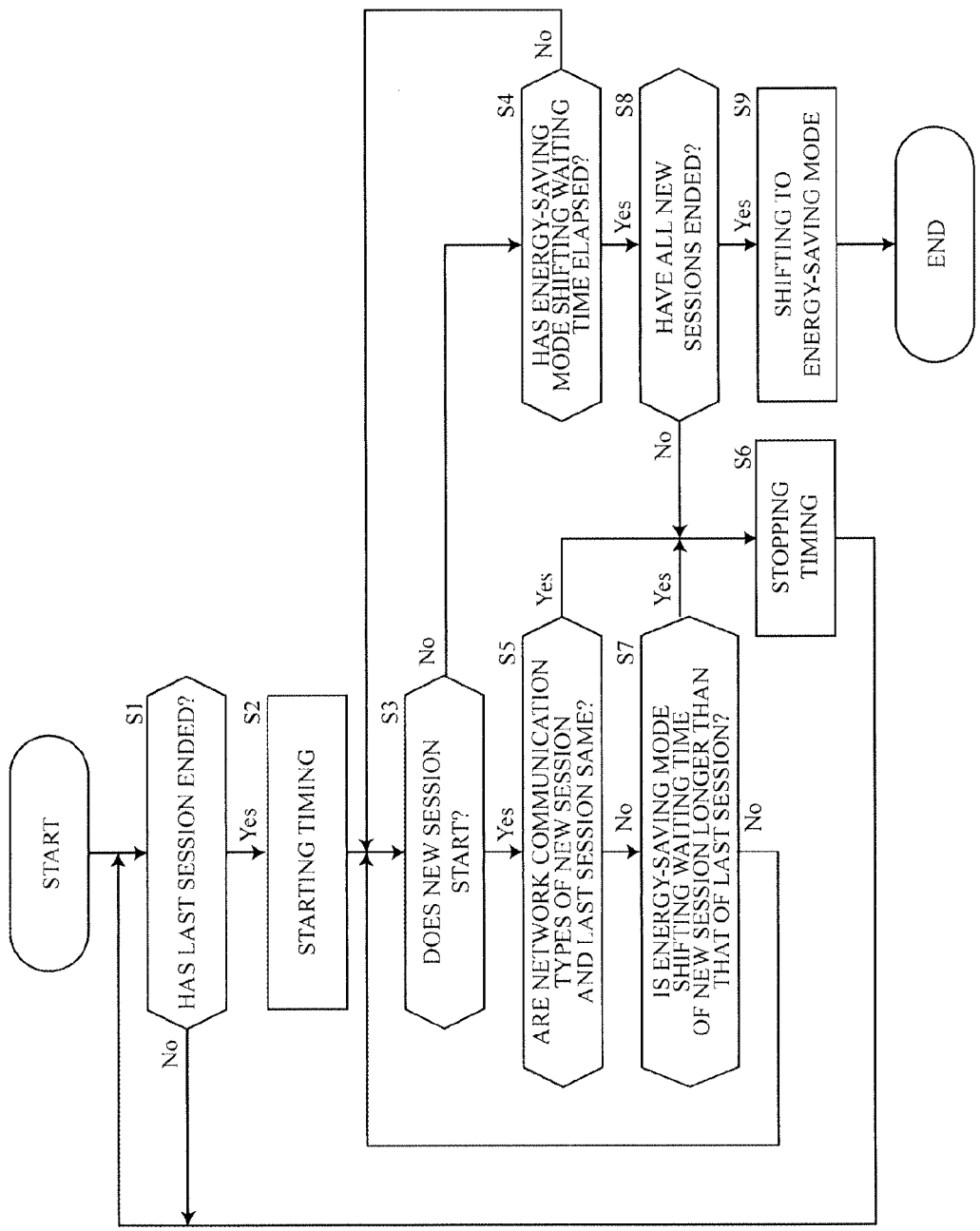
FIG. 3 illustrates an operation of an operation mode control unit performed after an end of a last session according to a second embodiment of the present disclosure.

FIG. 3 illustrates an operation of the operation mode control unit performed after an end of the last session, according to the second embodiment.

When sessions end for all the network communication types, in other words, the end time point of the last session (Step S1), the operation mode control unit starts the timing (Step S2), and identifies the energy-saving mode shifting waiting time regarding the last session. The energy-saving mode shifting waiting time regarding the last session is assumed as the energy-saving mode shifting waiting time corresponding to the network communication type of the last session. Note that, the energy-saving mode shifting waiting time may be calculated from the cumulative value of the network communication amount. For example, the energy-saving mode shifting waiting time is calculated by adding the value obtained by multiplying the cumulative value of the number of received packets by the specific coefficient to the basic waiting time (fixed value) corresponding to the network communication type.

Then, after the timing starts, the operation mode control unit monitors whether or not there is a notification of the new session start (Step S3), and whether or not the energy-saving mode shifting waiting time has elapsed (Step S4).

If there is a notification of the new session start before the energy-saving mode shifting waiting time has elapsed, the operation mode control unit determines whether or not the network communication type of the new session and the network communication type of the last session are the same (Step S5).

If the network communication type of the new session and the network communication type of the last session are the same, the operation mode control unit stops and resets the timing (Step S6). With this operation, this new session becomes the last session at a present time point.

If the network communication type of the new session and the network communication type of the last session are not the same, the operation mode control unit determines whether or not the energy-saving mode shifting waiting time regarding the new session is longer than the energy-saving mode shifting waiting time regarding the last session (Step S7).

If the network communication type of the new session and the network communication type of the last session are not the same, and if the energy-saving mode shifting waiting time regarding the new session is longer than the energy-saving mode shifting waiting time regarding the last session, the operation mode control unit stops and resets the timing (Step S6). With this operation, this new session becomes the last session at the present time point.

On the other hand, if the network communication type of the new session and the network communication type of the last session are not the same, and if the energy-saving mode shifting waiting time regarding the new session is not longer than the energy-saving mode shifting waiting time regarding the last session, the operation mode control unit returns to Step S3 and Step S4 to continue the timing regarding the last session.

Then, if it is determined that the energy-saving mode shifting waiting time regarding the last session has elapsed (Step S4), the operation mode control unit determines whether or not all the new sessions that have been notified of the start have ended (Step S8).

If all the new sessions that have been notified of the start have ended (including a case where there is no new session), the operation mode control unit outputs the instruction to shift to the energy-saving mode to a system control unit of a subsystem (Step S9). When receiving the instruction, the system control unit of the subsystem starts the operation of a communication processing unit and stops the power supply to a main system and the other internal apparatus. With this operation, the operation mode of the image forming apparatus shifts from the normal mode to the energy-saving mode.

On the other hand, if at least one of the new sessions that have been notified of the start has not ended, the timing is stopped and reset (Step S6). With this operation, the shifting from the normal mode to the energy-saving mode is not performed, and this new session becomes the last session at the present time point.

As described above, according to the second embodiment, if a new session is started while the energy-saving mode shifting waiting time is being timed, it is determined based on the network communication type of the new session and the energy-saving mode shifting waiting time whether or not to cancel the timing of the energy-saving mode shifting waiting time. Accordingly, the waiting time until shifting to the energy-saving mode is appropriately set based on the usage situation of the user.

Note that, the present disclosure is not limited to the above-mentioned embodiments and various modifications and changes can be made within the scope that does not depart from the gist of the present disclosure.

For example, in the above-mentioned embodiments, the communication processing unit may count the network communication amount regarding each network communication type in the energy-saving mode, and notify the operation mode control unit of a count value thereof when shifting from the energy-saving mode to the normal mode, while the operation mode control unit may add the count value to the network communication amount summed up in the normal mode.

Further, in the above-mentioned embodiments, the network communication amount may be counted starting from the previous time of shifting from the energy-saving mode to the normal mode.

Further, in the above-mentioned embodiments, the time point (time point Tc1=Tc0+Twc as illustrated in FIG. 2) to shift to the energy-saving mode is determined based on the energy-saving mode shifting waiting time regarding the last network communication. Instead, a time when the energy-saving mode shifting waiting time regarding all the network communication types elapses (in other words, time point Tb1=Tb0+Twb as illustrated in FIG. 2) or a time when the energy-saving mode shifting waiting time regarding any one of the types elapses (in other words, time point Ta1=Ta0+Twa as illustrated in FIG. 2) may the assumed as the time point to shift to the energy-saving mode.

Further, in the above-mentioned embodiments, the number of received packets is used as the network communication amount, but the number of sessions may be used instead.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An electronic apparatus, comprising:
a network interface that receives data via a network;
a communication processing unit that notifies of a network communication type identified by a protocol and a network communication amount of the received data; and
an operation mode control unit that switches an operation mode from a normal mode to an energy-saving mode when a network communication does not occur in the network interface before a waiting time based on the network communication amount for each network communication type notified of from the communication processing unit has elapsed,
wherein the operation mode control unit identifies the waiting time for each network communication type by adjusting a basic waiting time for each network communication type by using the network communication amount for each network communication type, and
wherein the basic waiting time regarding a transmission control protocol is shorter than the basic waiting time regarding a user datagram protocol.

2. The electronic apparatus according to claim 1, wherein the operation mode control unit is configured to switch the operation mode from the normal mode to the energy-saving mode when the network communication does not occur before the waiting time corresponding to the network communication type of a last network communication has elapsed.

3. The electronic apparatus according to claim 1, wherein the operation mode control unit:
starts timing of the waiting time corresponding to the network communication type of a last network communication starting from an end of the last network communication; and
continues the timing regarding the last network communication when a new network communication occurs before the waiting time corresponding to the network communication type of the last network communication has elapsed, if the network communication type of the last network communication and the network communication type of the new network communication are not the same, and if the waiting time corresponding to the network communication type of the new network communication is shorter than or equal to the waiting time corresponding to the network communication type of the last network communication.

4. The electronic apparatus according to claim 3, wherein the operation mode control unit cancels the timing and set the new network communication as the last network communication if the new network communication continues when the waiting time corresponding to the network communication type of the last network communication elapses.

5. The electronic apparatus according to claim 3, wherein the operation mode control unit cancels the timing and set the new network communication as the last network communication when the new network communication occurs before the waiting time corresponding to the network communication type of the last network communication has elapsed, if the network communication type of the last network communication and the network communication type of the new network communication are not the same, and if the waiting time corresponding to the network communication type of the new network communication is longer than the waiting time corresponding to the network communication type of the last network communication.

6. The electronic apparatus according to claim 3, wherein the operation mode control unit cancels the timing and set the new network communication as the last network communication when the new network communication occurs before the waiting time corresponding to the network communication type of the last network communication has elapsed, if the network communication type of the last network communication and the network communication type of the new network communication are the same.

7. The electronic apparatus according to claim 1, wherein the network communication amount includes a number of received packets.

8. The electronic apparatus according to claim 1, wherein the network communication amount includes a number of sessions,
wherein the operation mode control unit counts the number of sessions, and wherein the operation mode control unit determines that the session of the user datagram protocol has ended if user datagram protocol data does not arrive in a specific time.

9. An electronic apparatus, comprising:
a network interface that receives data via a network;
a communication processing unit that notifies of a network communication type identified by a port number and a network communication amount of the received data; and
an operation mode control unit that switches an operation mode from a normal mode to an energy-saving mode when a network communication does not occur in the network interface before a waiting time based on the network communication amount for each network communication type notified of from the communication processing unit has elapsed,
wherein the operation mode control unit identifies the waiting time for each network communication type by adjusting a basic waiting time for each network communication type by using the network communication amount for each network communication type,
wherein the basic waiting time regarding the network communication type of the port number assigned to a print job that is required for heating a fixing device before the print job is executed when the operation mode returns to the normal mode is longer than the basic waiting time for the network communication type of another port number assigned to a facsimile transmission job.

10. A non-transitory computer-readable recording medium having stored thereon an operation mode control program executed by a computer of an electronic apparatus, the operation mode control program comprising:
a first program code that causes the computer to receive data via a network;
a second program code that causes the computer to notify of a network communication type identified by a protocol and a network communication amount of the received data; and
a third program code that causes the computer to switch an operation mode from a normal mode to an energy-saving mode when a network communication does not occur before a waiting time based on the network communication amount for each network communication type notified of by the second program code has elapsed,
wherein the third program code causes the computer to identify the waiting time for each network communication type by adjusting a basic waiting time for each network communication type by using the network communication amount for each network communication type, and
wherein the basic waiting time regarding a transmission control protocol is shorter than the basic waiting time regarding a user datagram protocol.

11. The non-transitory computer-readable recording medium according to claim 10, wherein the third program code causes the computer to switch the operation mode from the normal mode to the energy-saving mode when the network communication does not occur before the waiting time corresponding to the network communication type of a last network communication has elapsed.

12. The non-transitory computer-readable recording medium according to claim 10, wherein the third program code causes the computer to:

start timing of the waiting time corresponding to the network communication type of a last network communication starting from an end of the last network communication; and
continue the timing regarding the last network communication when a new network communication occurs before the waiting time corresponding to the network communication type of the last network communication has elapsed, if the network communication type of the last network communication and the network communication type of the new network communication are not the same, and if the waiting time corresponding to the network communication type of the new network communication is shorter than or equal to the waiting time corresponding to the network communication type of the last network communication.

13. The non-transitory computer-readable recording medium according to claim 12, wherein the third program code causes the computer to cancel the timing and set the new network communication as the last network communication if the new network communication continues when the waiting time corresponding to the network communication type of the last network communication elapses.

14. The non-transitory computer-readable recording medium according to claim 12, wherein the third program code causes the computer to cancel the timing and set the new network communication as the last network communication when the new network communication occurs before the waiting time corresponding to the network communication type of the last network communication has elapsed, if the network communication type of the last network communication and the network communication type of the new network communication are not the same, and if the waiting time corresponding to the network communication type of the new network communication is longer than the waiting time corresponding to the network communication type of the last network communication.

15. The non-transitory computer-readable recording medium according to claim 12, wherein the third program code causes the computer to cancel the timing and set the new network communication as the last network communication when the new network communication occurs before the waiting time corresponding to the network communication type of the last network communication has elapsed, if the network communication type of the last network communication and the network communication type of the new network communication are the same.

16. An operation mode control method, comprising:
receiving, by a network interface, data via a network;
notifying, by a communication processing unit, of a network communication type identified by a port number and a network communication amount of the received data;
switching, by an operation mode control unit, an operation mode from a normal mode to an energy-saving mode when a network communication does not occur in the network interface before a waiting time based on the network communication amount for each network communication type notified of from the communication processing unit has elapsed; and
identifying, by the operation mode control unit, the waiting time by adjusting a basic waiting time for each network communication type by using the network communication amount for each network communication type,
wherein the basic waiting time regarding the network communication type of the port number assigned to a print job that is required for heating a fixing device before the print job is executed when the operation mode returns to the normal mode is longer than the basic waiting time for the network communication type of another port number assigned to a facsimile transmission job.

17. An operation mode control method, comprising:
receiving, by a network interface, data via a network;
notifying, by a communication processing unit, of a network communication type identified by a protocol and a network communication amount of the received data;
switching, by an operation mode control unit, an operation mode from a normal mode to an energy-saving mode when a network communication does not occur in the network interface before a waiting time based on the network communication amount for each network communication type notified of from the communication processing unit has elapsed; and
identifying, by the operation mode control unit, the waiting time by adjusting a basic waiting time for each network communication type by using the network communication amount for each network communication type,
wherein the basic waiting time regarding a transmission control protocol is shorter than the basic waiting time regarding a user datagram protocol.

18. A non-transitory computer-readable recording medium having stored thereon an operation mode control program executed by a computer of an electronic apparatus, the operation mode control program comprising:
a first program code that causes the computer to receive data via a network;
a second program code that causes the computer to notify of a network communication type identified by a port number and a network communication amount of the received data; and
a third program code that causes the computer to switch an operation mode from a normal mode to an energy-saving mode when a network communication does not occur before a waiting time based on the network communication amount for each network communication type notified of by the second program code has elapsed,
wherein the third program code causes the computer to identify the waiting time for each network communication type by adjusting a basic waiting time for each network communication type by using the network communication amount for each network communication type, and
wherein the basic waiting time regarding the network communication type of the port number assigned to a print job that is required for heating a fixing device before the print job is executed when the operation mode returns to the normal mode is longer than the basic waiting time for the network communication type of another port number assigned to a facsimile transmission job.

* * * * *